(12) United States Patent
Milleret et al.

(10) Patent No.: US 8,897,345 B2
(45) Date of Patent: Nov. 25, 2014

(54) METHOD AND DEVICE FOR TRANSMITTING A SIGNAL USING A TRANSMISSION POWER MASK

(75) Inventors: Hervé Milleret, Bourg-la-Reine (FR); Olivier Isson, Bourg-la-Reine (FR)

(73) Assignee: MStar Semiconductor, Inc., Hsinchu County (TW)

( * ) Notice: Subject to any disclaimer, the term of this patent is extended or adjusted under 35 U.S.C. 154(b) by 0 days.

(21) Appl. No.: 13/992,849

(22) PCT Filed: Jan. 26, 2012

(86) PCT No.: PCT/FR2012/050171
§ 371 (c)(1),
(2), (4) Date: Jul. 3, 2013

(87) PCT Pub. No.: WO2012/101386
PCT Pub. Date: Aug. 2, 2012

(65) Prior Publication Data
US 2013/0287074 A1    Oct. 31, 2013

(30) Foreign Application Priority Data

Jan. 27, 2011   (FR) ..................... 11 50650

(51) Int. Cl.
| | | |
|---|---|---|
| *H04B 1/38* | (2006.01) | |
| *H04B 3/54* | (2006.01) | |
| *H04B 3/06* | (2006.01) | |
| *H04B 3/46* | (2006.01) | |
| *H04L 1/24* | (2006.01) | |
| *H04L 25/02* | (2006.01) | |
| *H04L 25/03* | (2006.01) | |

(52) U.S. Cl.
CPC .................. *H04B 3/542* (2013.01); *H04B 3/06* (2013.01); *H04B 3/46* (2013.01); *H04B 3/54* (2013.01); *H04L 1/243* (2013.01); *H04L 25/0278* (2013.01); *H04L 25/03828* (2013.01); *H04B 2203/5445* (2013.01)
USPC ........... 375/219; 375/220; 375/222; 375/229; 375/295; 375/316

(58) Field of Classification Search
CPC .... H04B 3/46; H04B 2203/5445; H04B 3/06; H04B 3/54; H04B 3/542; H04B 3/32; H04L 1/243; H04L 25/0278; H04L 25/03828; H04L 5/0007; H04L 5/0046; H04L 5/006; H04L 25/03; H04L 27/26; H04L 5/003
USPC ......... 375/219, 220, 222, 224, 229, 230, 259, 375/261, 270, 273, 280, 295, 297, 299, 306, 375/316, 317, 319, 322, 339, 345, 350
See application file for complete search history.

(56) References Cited

U.S. PATENT DOCUMENTS 6,970,515 B1 * 11/2005 Bicakci et al. ................ 375/257
7,330,516 B2 * 2/2008 Cendrillon et al. .......... 375/295

(Continued)

FOREIGN PATENT DOCUMENTS

WO    WO 2010037957 A1 *  4/2010 ............... H04B 3/46

*Primary Examiner* — Hirdepal Singh
(74) *Attorney, Agent, or Firm* — WPAT, PC; Justin King

(57) ABSTRACT

Method for transmitting a signal using a transmission power mask is disclosed. The signal is transmitted by a transceiver A and is connected to a transceiver B via at least one physical link; wherein the transmission power mask is adapted according to a transfer function relative to the impedance of the physical link, so as the power lost during signal transmission is taken into account.

12 Claims, 10 Drawing Sheets

(56) References Cited

U.S. PATENT DOCUMENTS

| | | | |
|---|---|---|---|
| 8,009,692 B2* | 8/2011 | Basso et al. | 370/465 |
| 8,351,490 B2* | 1/2013 | Chen et al. | 375/219 |
| 2003/0099350 A1* | 5/2003 | Bostoen et al. | 379/417 |
| 2005/0180519 A1* | 8/2005 | Betts | 375/260 |
| 2006/0133534 A1* | 6/2006 | Verlinden et al. | 375/285 |
| 2006/0192672 A1* | 8/2006 | Gidge et al. | 340/538.11 |
| 2007/0076505 A1* | 4/2007 | Radtke et al. | 365/222 |
| 2010/0103002 A1* | 4/2010 | Yonezawa et al. | 341/100 |
| 2011/0170633 A1* | 7/2011 | Avril et al. | 375/296 |
| 2012/0057693 A1* | 3/2012 | Chow et al. | 379/406.1 |
| 2013/0279517 A1* | 10/2013 | Efendowicz et al. | 370/466 |

* cited by examiner

METHOD AND DEVICE FOR TRANSMITTING A SIGNAL USING A TRANSMISSION POWER MASK

FIELD OF THE INVENTION

The invention relates to a method for transmitting a signal using a transmission power mask in a telecommunication network and to a device for implementing said method.

The invention applies to the field of digital data transmission in a wired or wireless telecommunication network.

STATE OF THE RELATED ART

In such a communication network, digital data is exchanged between devices capable of receiving and transmitting digital data via a physical link corresponding to a communication channel.

This communication network may, for example, relate to a network for transporting electricity wherein the physical links consist in electrical cables or wires that may be power transmission cables or communication cables used in fixed installations (distribution network, internal or external communication network) or mobile installations (power or communication network in an aircraft, boat, car, etc.). Such electrical cables or wires are in some cases suitable for transporting high voltages at very low frequencies, for example 220V/50 Hz for Europe.

In this type of communication network, digital data, related to various kinds of information, may be transmitted using power line communication.

The technical problem arising in these communication networks, and in particular in networks for transporting electricity, is that of being able to ensure optimal injection of a signal in a physical link, so as to counteract power loss between the signal transmitted by the transmitter and the signal received by the remote receiver.

Indeed, in a network for transporting power, the physical links, such as electrical wires, are not suitable for transporting voltages at high frequencies such as those used by these transceivers such as power line communication modems.

Indeed, data transmission may be subject to various phenomena and particularly reflection phenomena, since the signal transmitted and thus injected into the physical link by the transceiver is partially reflected due to an impedance discontinuity of the physical link, the cause whereof is for example associated with numerous splices and other shunts or equipment connected to the link, or in that the wires are not paired and frequently of very different lengths.

As such, as a result of these reflections, a portion of the power transmitted by the transmitter returns to the device, thus restricting the range of the injected signal.

In this way, as illustrated in FIG. 1, when the transceiver transmits a frequency signal referenced X in the physical link, a portion of this signal is reflected as an echo S11.X, and a further portion of the signal S0.X is injected into the physical link. The term echo will be used hereinafter to denote the power returned to the transmitter having transmitted the signal.

The two quantities S11 and S0, which are the transfer functions of the reflected signal and the injected signal respectively, are correlated with the following relations:

$$|S0|^2 \leq 1$$

$$|S11|^2 = 1 - |S0|^2$$

Since the absolute value of S0 is smaller than 1, the phenomenon is expressed by a transmitted power loss.

Concerning the transmission power mask, it is important to note that telecommunication systems are conventionally used in a national or international regulatory context. A regulatory authority thus defines a maximum authorised power level which is generally expressed in the form of a transmission mask. This mask is fixed and sets the transmitted signal power. Consequently, the signal X transmitted by the transceiver will have an injected power in the physical link which should be equal to or as close as possible to that of the transmission mask.

It is thus clear that if the transfer function S11 is known precisely, it would be possible to optimally adjust the transmitted power so as not to exceed the maximum authorised by the constant reference value. In this way, the transceiver transmitting the signal is capable of modifying the power of the transmitted signal by transmitting X/S0 instead of X such that the injected signal consists of S0.X/S0=X.

In the prior art, a document relating to an international application WO2010/037957, illustrated in FIG. 2, featuring this principle is known, describing a method for estimating this echo to be able to transmit a signal accounting for this estimation and thus adapt the transmission power mask.

However, a major drawback of this method is in that the estimation of the echo H performed on the basis of the signal received H.X is inaccurate in that the estimated echo H contains transceiver reception chain imperfections with the transfer function $H = S11 + H_{imp}$ where $H_{imp}$ denotes the transfer function of the imperfections of the reception chain.

Such imperfections thus introduce an error into the estimation of this echo and, by extension, in the determination of the power to be injected into the physical link.

Furthermore, such an error may create an overshoot of the maximum authorised power level in a communication network.

DESCRIPTION OF THE INVENTION

The invention proposes to enhance the determination of the power loss between the signal transmitted by the transmitter and the signal injected into the physical link and received by the remote receiver so as to counteract their power loss in data transmission.

For this purpose, one aspect of the invention relates to a method for transmitting a signal using a transmission power mask, the signal being transmitted by a transmitter A that is connected to a transceiver B via at least one physical link, wherein said transmission power mask is adapted according to a transfer function S11 relative to the impedance of the physical link, so as to take account of the power lost during signal transmission.

According to particular embodiments:

- the method comprises an initializing step further comprising sub-steps for measuring voltages $V_{Ref}$, $V_{Ana}$ at the terminals of a constituent element of the transmission chain of the transceiver A and for determining S11;
- the initializing step is performed at configurable predefined times;
- a plurality of transmission power masks are defined and selected successively for use during signal transmission, and
- the measurement sub-steps are performed using the activation of connectors (14, 13) of a switch within the reception chain of the transceiver A.

The invention also relates to a signal transceiver using a transmission power mask to a transceiver B via at least one physical link, comprising:
a data transmission chain, and
a data reception chain comprising a switch.
According to particular embodiments:
the data transmission chain comprises:
a digital signal processing module;
a digital to analogue conversion module;
an anti-aliasing filter;
an amplifier;
a protective resistor, and
a coupling device;
the data reception chain comprises:
a coupling device;
a band filter;
a variable gain amplifier;
an analogue to digital conversion module;
a switch, and
a digital signal processing module;
the switch comprises:
a terminal 1 connected upstream from one of the following constituent elements of the transmission chain: the protective resistor at the location 8, the amplifier at the location 9, or an anti-aliasing filter at the location 10, and
terminals 4, 5, 6 connected upstream 11 from the band filter of the reception chain;
a control module suitable for controlling the activation of connectors 12, 13, 14 of the switch;
the control module is linked to a module for measuring the signal received by the digital signal processing module so as to determine the voltages $V_{Ref}$, $V_{Ana}$ of each signal received according to the activation of the connectors 12, 13, 14 of the switch, and
the transceiver is a power line communication modem comprising a switch.

BRIEF DESCRIPTION OF THE FIGURES

Further features and advantages of the invention will emerge on reading the following description, with reference to the appended figures, illustrating in.

For more clarity, identical or similar elements are identified with identical reference signs throughout the figures.

DETAILED DESCRIPTION OF AN EMBODIMENT

Figure 1:
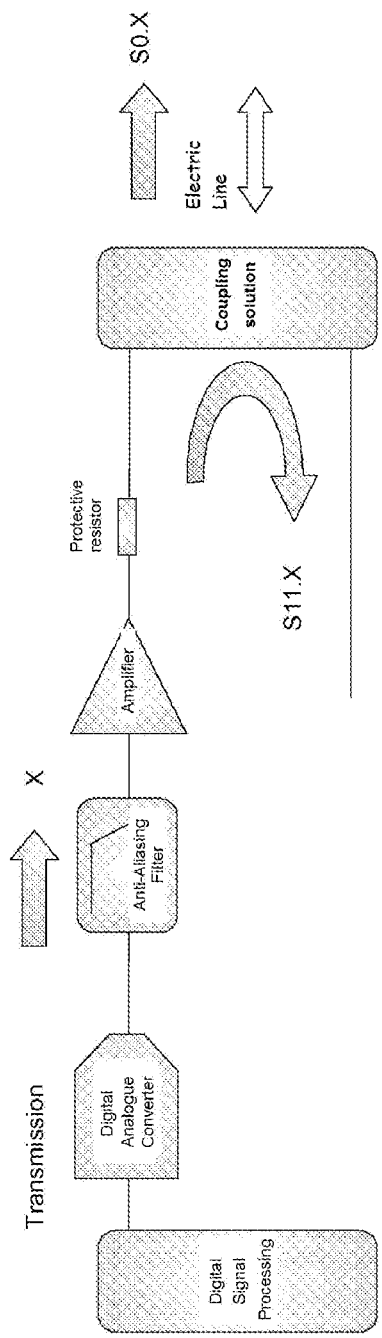
FIG. 1, a schematic representation of the power loss in a transceiver.
Figure 2:
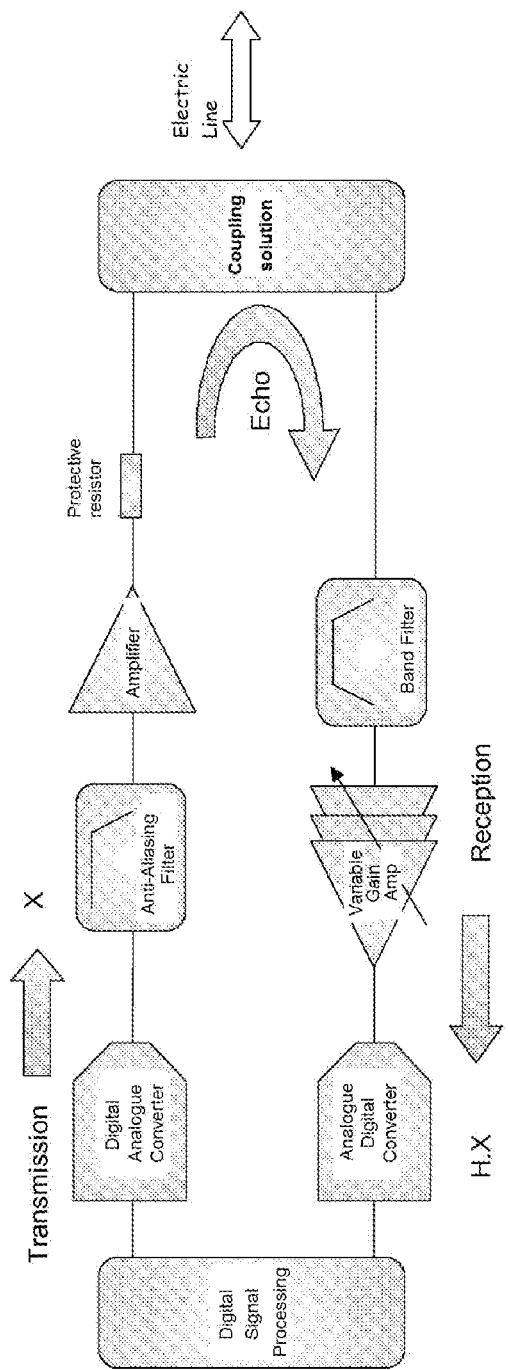
FIG. 2, a schematic view of the method described in the document WO2010/037957.
Figure 3:
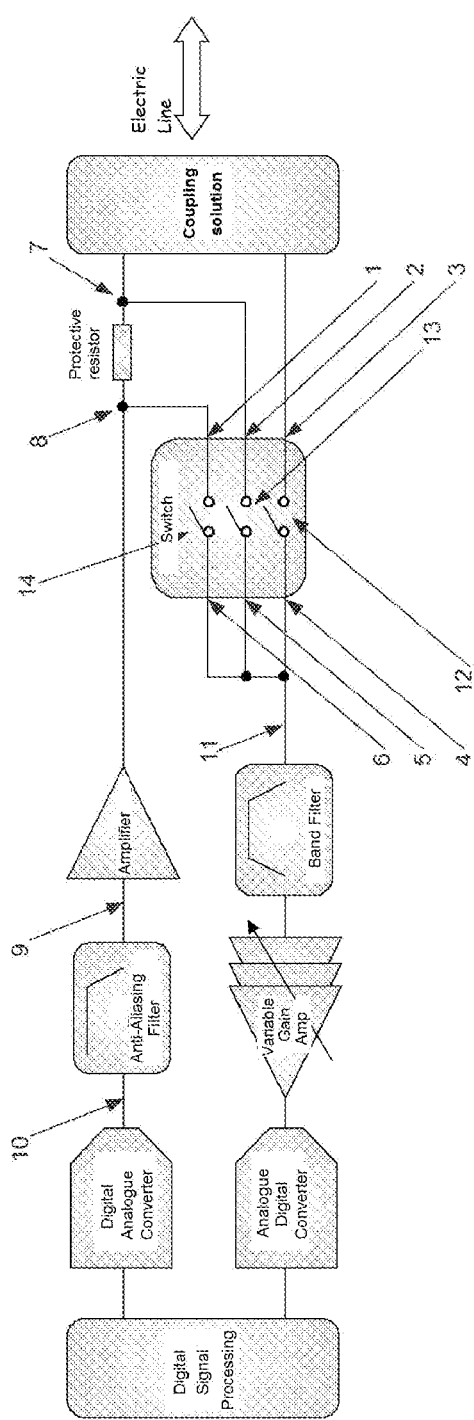
FIG. 3, the transceiver according to one embodiment of the present invention.

In an example of an embodiment, FIG. 3 describes the transceiver according to one embodiment of the invention.

In the present embodiment, the transceiver is considered to relate to a power line communication modem used in a network for transporting electricity wherein the physical links consist of electrical cables or wires. This example of an embodiment of the present invention thus falls under power line communication data transmission, commonly referred to as power line transmission (PLT).

The cables concerned may be power transmission cables or communication cables, in fixed installations (distribution network, internal or external communication network) or mobile installations (power or communication network in an aircraft, boat, car, etc.). The cables in question may be of any type: coaxial or bifilar, in parallel lines or paired, low-voltage electrical lines (110V/220V), medium-voltage electrical lines (~15 kV), telephone cable, twisted pair, coaxial cable, etc.

In such a network, a transceiver A is capable of transmitting digital data to a transceiver B via the physical link.

For this purpose, a transceiver A or B comprises a data transmission chain and a data reception chain.

Figure 4A:
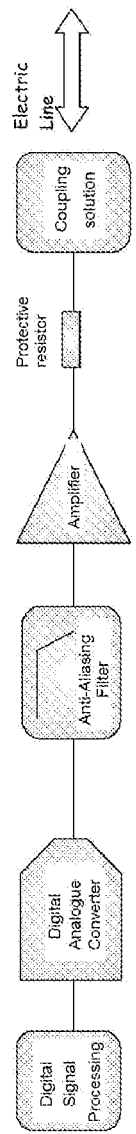
FIG. 4A, the data transmission chain of the transceiver.

The data transmission chain illustrated in FIG. 4A comprises:
a digital signal processing module;
a digital to analogue conversion module;
an anti-aliasing filter;
an amplifier;
a protective resistor, and
a coupling device (or coupling solution).

It should be noted that the protective resistor ensures the stability of the amplifier regardless of the load presented.

Furthermore, the digital signal processing module is particularly suitable for modifying the signal power transmitted by the transceiver to another transceiver acting as a remote receiver.

Figure 4B:
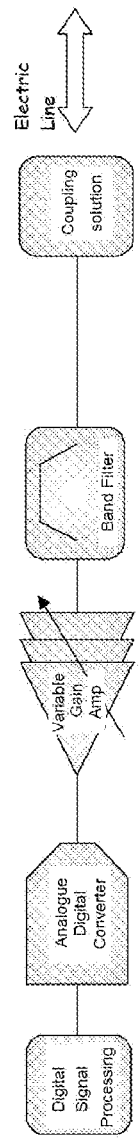
FIG. 4B, the data reception chain of the transceiver.

The data reception chain illustrated in FIG. 4B comprises:
a coupling device (or coupling solution);
a band filter;
a variable gain amplifier;
an analogue to digital conversion module;
a switch, and
a digital signal processing module.

Figure 9:
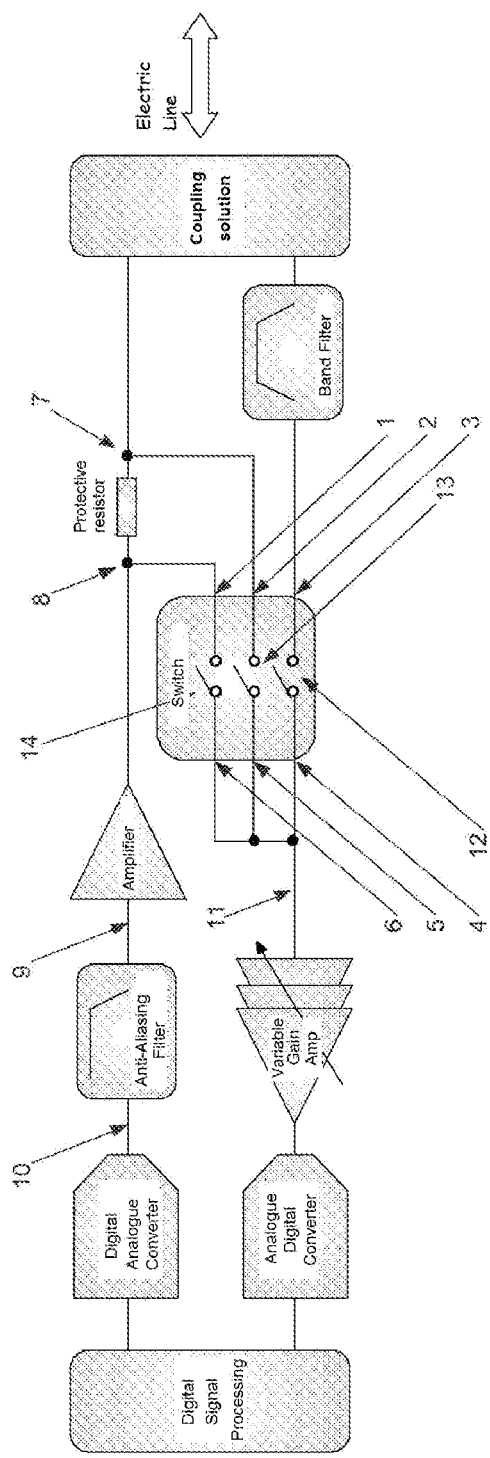
FIG. 9, one embodiment of the present invention wherein the switch is located between the variable gain amplifier and the band filter, and
FIG. 10, one alternative embodiment of the present invention wherein the switch is located between the analogue to digital conversion module and the variable gain amplifier.
Figure 10:
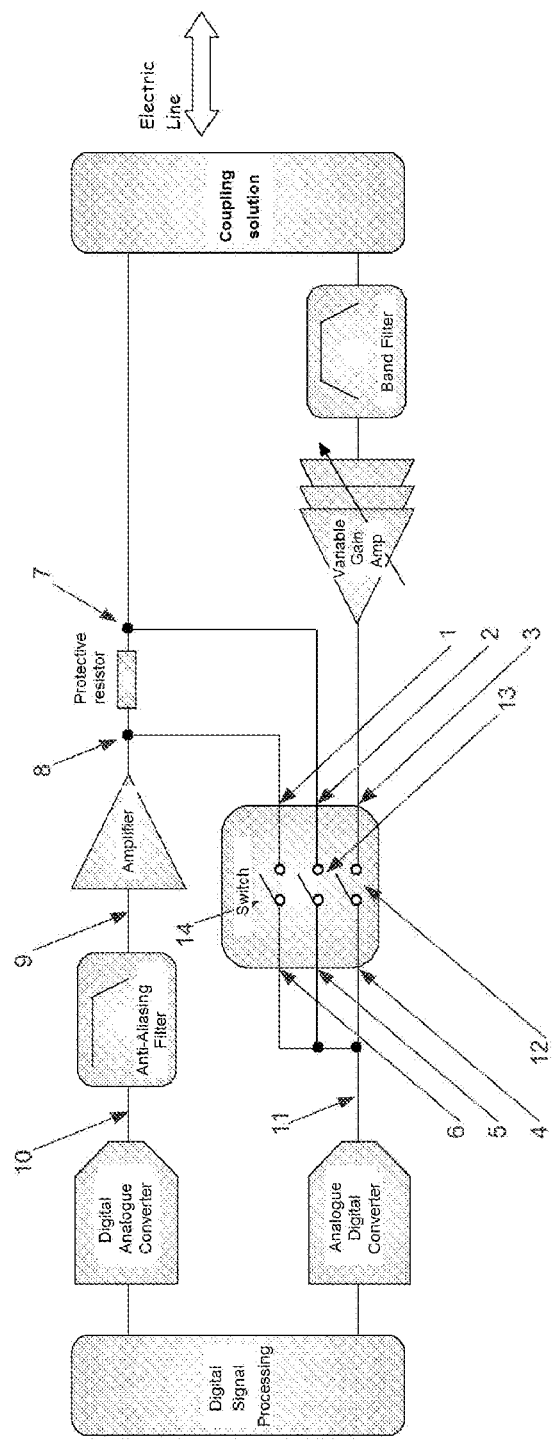

The switch may be located, in a non-limiting manner, either:
between the variable gain amplifier and the band filter as illustrated in FIG. 9, or
between the analogue to digital conversion module and the variable gain amplifier as represented in FIG. 10 or
between the coupling device (or coupling solution) and the band filter, as illustrated in FIG. 3.

This switch comprises, in a non-limiting manner, three input terminals 1, 2, 3 and three output terminals 4, 5, 6.

The terminal 2 is generally connected downstream from the protective resistor at the location 7.

The terminal 7 is connected upstream from one of the following constituent elements of the transmission chain:
the protective resistor at the location 8;
the amplifier at the location 9, and
the anti-aliasing filter at the location 10.

The terminals 4, 5, 6 are connected upstream 11 from the band filter.

Figure 6A:
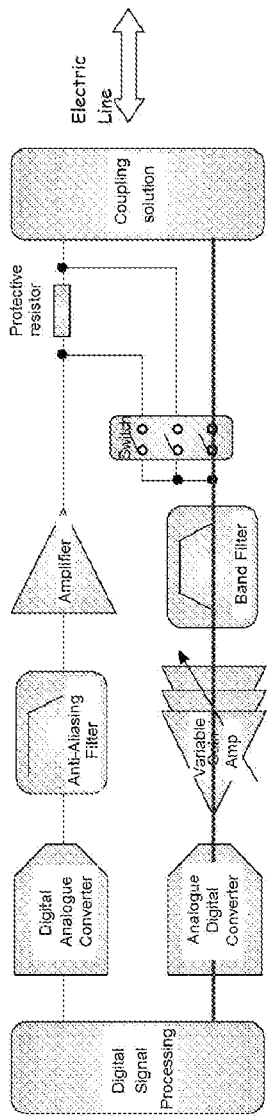
FIGS. 6A, 6B and 6C, a schematic view of the determination of the echo in a transceiver comprising a switch according to one embodiment of the present invention.

The terminal 3 is connected to the coupling device, and thus enables an incoming signal to be received on the digital signal processing module, as illustrated in FIG. 6A.

In alternative embodiments, the terminal 1 may be connected upstream from one of the following elements:
the amplifier at the location 9, or
the anti-aliasing filter at the location 10.

In this way, errors from the anti-aliasing filter and/or the amplifier may be taken into account to balance the measurements made.

Figure 8:
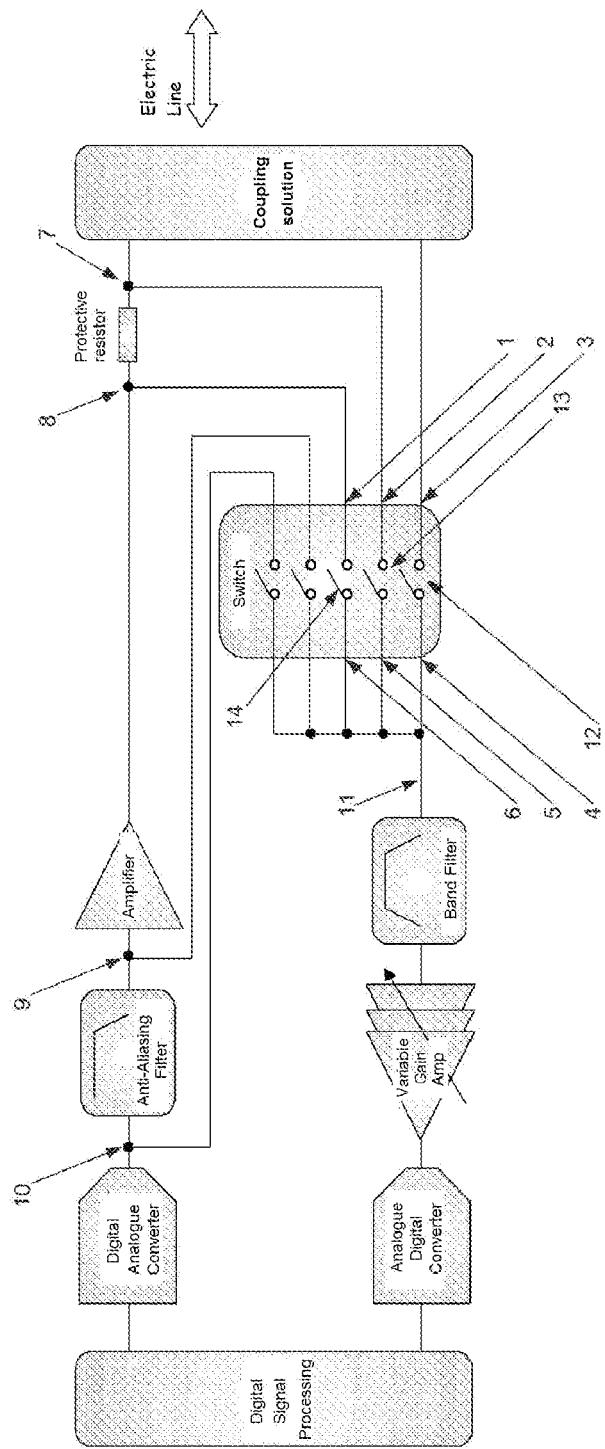
FIG. 8, one embodiment of the present invention wherein the switch has five input/output terminals.

It should be noted that in a further embodiment illustrated in FIG. 8, the switch comprises five input terminals and five output terminals connected upstream 11 from the band filter. The five input terminals are respectively connected:
downstream from the protective resistor at the location 7;
to the coupling device;
upstream from the protective resistor at the location 8;
upstream from the amplifier 9, and upstream from the anti-aliasing filter at the location 10.

This switch is connected to a control module controlling the activation of the connectors 12, 13 and 14.

This control module is located in a non-limiting manner in the digital signal processing module.

Figure 6B:
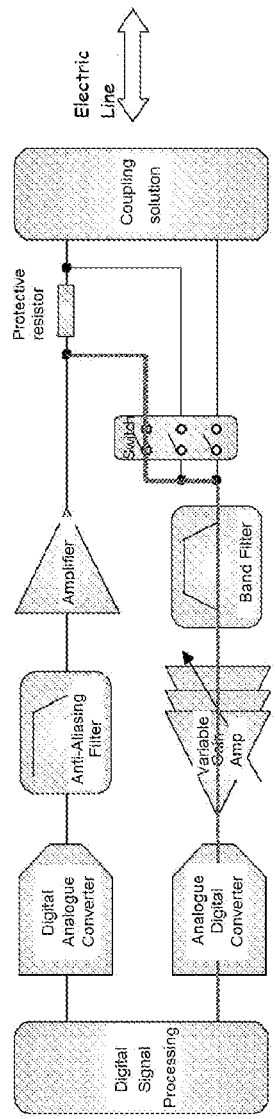
Figure 6C:
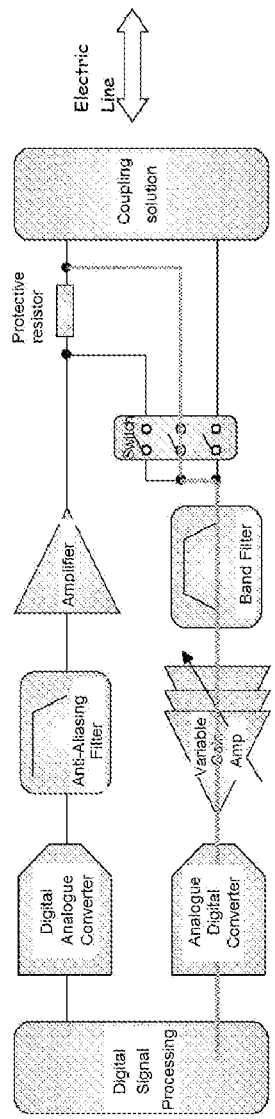
Figure 7:
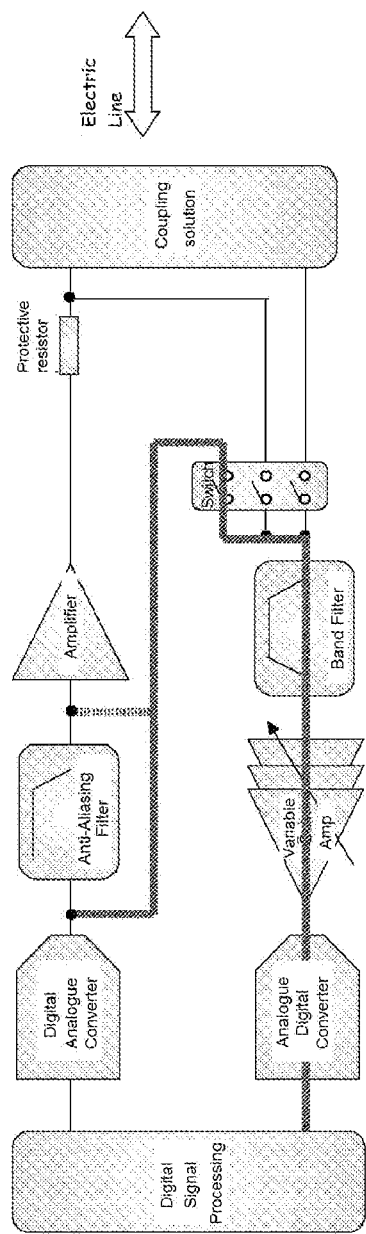
FIG. 7, a method for measuring the reference voltage in a further embodiment.

This control module engages with a module for measuring the signal received in the digital processing module so as to determine the voltages of each signal received based on the activation of the connectors 12, 13 and 14, as illustrated in FIGS. 6A, 6B and 6C.

This measurement module is also located in a non-limiting manner in the digital signal processing module.

Once the voltages of the signals received have been measured, the measurement module transmits said voltages to processing means to calculate the impedance presented by the power line.

For this purpose, in the embodiment of the present invention, the reception chain of the transceiver is used to measure the voltages downstream ($V_{Ana}$: Test voltage) and upstream ($V_{Ref}$: Reference voltage) from the protective resistor of the transmission chain, which thus becomes a measurement resistor $R_{mes}$.

Figure 5:
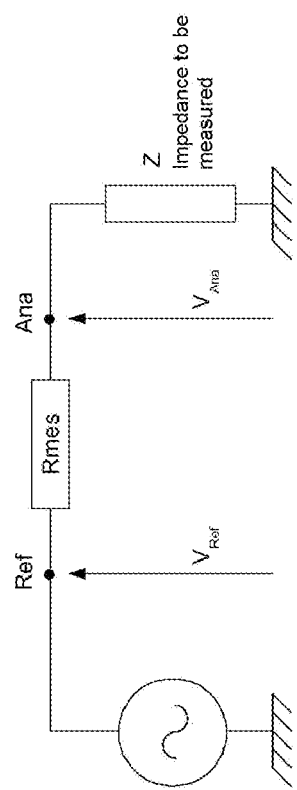
FIG. 5, a diagram illustrating the measurement of the impedance of a load using a resistor Rmes.

As such, this impedance calculation consists in determining the impedance of a load using a resistor in an electronic circuit, as illustrated in FIG. 5 and comprising a measurement resistor $R_{mes}$, and the impedance Z to be measured.

This impedance is obtained from operations performed using the following formula:

$$Z = \frac{Rmes}{\frac{VRef}{VAna} - 1}$$

where $V_{Ref}$ is the voltage at the point Ref (Reference voltage) $V_{Ana}$ (Test voltage) the voltage at the point Ana. It should be noted that if $V_{Ref}$ and $V_{Ana}$ are complex voltages, then the impedance calculated is also complex.

In the method according to the present invention, the transceiver A transmits a signal according to a transmission power mask, equal to or as close as possible to that of the maximum authorised power level, defined by the digital signal processing module of the transmission chain.

For this purpose, this method comprises an initializing step implemented by the transceiver A, comprising the following sub-steps:
activation by the control module of the connector 14 of the switch so as to route the signal X to the reception chain, as illustrated in FIG. 6B;
transmission of a first signal X by the digital signal processing module of the transmission chain;
measurement by the measurement module of the voltage $V_{Ref}$ upstream from the protective resistor;
deactivation by the control module of the connector 14 of the switch;
activation by the control module of the connector 13 of the switch so as to route the signal X to the reception chain, as illustrated in FIG. 6C;
measurement by the measurement module of the voltage $V_{Ana}$ downstream from the protective resistor, and
deactivation by the control module of the connector 13 of the switch;
determination of the transfer function S11 obviously not accounting for the impedance of the reception chain.

The two measurement sub-steps are performed by the measurement module which is capable of measuring the signal received by the digital signal processing module of the transceiver A.

Alternatively, it may be specified that the measurement module may relate to an element of the transceiver wherein the reception chain is duplicated and whereon it may thus carry out regular measurements relating to the impedance of the physical link.

The processing means subsequently determine the transfer function S11 based on operations using the following formula:

$$S11 = \frac{(Z - Z0)}{(Z + Z0)}$$

with:

$$Z = \frac{Rmes}{\frac{VRef}{VAna} - 1},$$

and $$Z0 = 50 \, \Omega$$

It should be noted that Z0 refers to the reference impedance which is the impedance with which the injected power measurements are made. In the context of power line transmission, commonly referred to as PLT, the standardisation organisations define the measurement impedance as the value 50 Ohms.

Once the transfer function S11 has been determined, the transceiver processing means associated with the digital signal processing module define the power mask according to the transfer function S11 to compensate for the injected power in the physical link.

This adaptation is performed by the signal processing module which is thus capable of modifying the power of the transmitted signal by transmitting X/S0 instead of X so that the injected signal consists of S0.X/S0=X.

X is the frequency signal transmitted by the transceiver A and S0.X another portion of this signal injected in the physical link. S0 is the transfer function of the injected signal and consists of: $|S0|^2 = 1 - |S11|^2$ Adapting the power mask thus consists of increasing/decreasing the power to be injected into the physical link so that the power received by the transceiver B is greater than that received without applying an adapted power mask. In this way, the throughput and/or the quality of service are enhanced, or increased.

In a further embodiment, the step for initializing the transceiver may systematically precede the adaptation step according to certain conditions:
change of configuration parameters of the transceiver A:
change of radio frequency (RF);
change of symbol time,
detection of change of physical link characteristics.

Indeed, this initializing step is performed once the power mask is to be updated. It may be programmed to be run regularly or cyclically according to an event detected by the digital signal processing module of the transceiver A associated with the processing means of the transceiver A.

In a further embodiment, the transfer function S11 may also be determine continuously (or occasionally) at each data transmission made by the transceiver A in order to continuously (or occasionally) estimate and adjust the power mask to be adapt to each transmission.

Moreover, in one particular embodiment, the progression of the transfer function S11 may also be determined over time over a period corresponding to the synchronous periodic variation of the physical link with the mains voltage to subsequently define suitable power masks for each variation period.

In this way, it is understood that the invention is not limited to the examples of embodiments described and illustrated. Furthermore, it is not limited to this type of power line communication data transmission and may be applied to other types of wired transmission or wireless transmissions.

What is claimed is:

1. A method for transmitting a signal using a transmission power mask, comprising:
    providing a signal transceiver, comprising: a signal processing module; a data transmission chain, coupled between said signal processing module and a coupling device, said data transmission chain comprising a protective resistor; and a data reception chain, coupled between said coupling device and said signal processing module;
    measuring a reference voltage before said protective resistor;
    measuring a test voltage after said protective resistor;
    determining a transfer function from said reference voltage and said test voltage; and
    adapting said transmission power mask according to said transfer function, to compensate for power lost during signal transmission.

2. The method according to claim 1, wherein said data reception chain comprises a switch, comprising: a first input terminal, coupled to said data transmission chain between said signal processing module and said protective resistor; a second input terminal, coupled to said data transmission chain between said protective resistor and said coupling device; and a third input terminal, coupled to said coupling device; and a first output terminal;
    wherein said measuring a reference voltage step comprises activating said first terminal to measure said reference voltage, and said measuring a test voltage step comprises deactivating said first terminal and activating said second terminal to measure said test voltage.

3. The method according to claim 2, wherein said activating, deactivating, determining and adapting steps are performed at configurable predefined times.

4. The method according to claim 3, wherein a plurality of transmission power masks are defined and selected periodically for use during signal transmission.

5. A signal transceiver using a transmission power mask via at least one physical link, comprising:
    a digital signal processing module;
    a data transmission chain, coupled between said digital signal processing module and a coupling device, said data transmission chain comprising a protective resistor;
    a data reception chain, coupled between said coupling device and said digital signal processing module, said data reception chain comprising a switch, comprising:
    a first input terminal, coupled to said data transmission chain between said digital signal processing module and said protective resistor;
    a second input terminal, coupled to said data transmission chain between said protective resistor and said coupling device;
    a third input terminal, coupled to said coupling device; and
    a first output terminal;
    wherein said digital signal processing module adapts said transmission power mask according to a transfer function relative to the impedance of the physical link to compensate for power lost during signal transmission.

6. The transceiver according to claim 5, wherein said data transmission chain comprises:
    a digital to analogue conversion module;
    an anti-aliasing filter; and
    an amplifier.

7. The transceiver according to claim 5, wherein said data reception chain comprises:
    a band filter;
    a variable gain amplifier; and
    an analogue to digital conversion module.

8. The transceiver according to claim 7, wherein said first output terminal is coupled to said data reception chain between said band filter and said digital signal processing module.

9. The transceiver according to claim 5, further comprising a control module for controlling said switch to selectively enable said first input terminal, said second input terminal, or said third input terminal.

10. The transceiver according to claim 9, wherein said control module engages with said digital signal processing module to determine voltages corresponding to said first input terminal, said second input terminal, and said third input terminal, and adapt said transmission power mask accordingly.

11. The transceiver according to claim 5, wherein said coupling device couples to a power line, and said transceiver functions as a power line communication modem.

12. A method for transmitting a signal using a transmission power mask, comprising:
    providing a data transmission chain, comprising: a digital signal processing module; a digital to analogue conversion module; an anti-aliasing filter; an amplifier; a protective resistor; and a coupling device;
    performing an initialization step, comprising:
        measuring a reference voltage at a first terminal of a constituent element of said data transmission chain;
        measuring a test voltage at a second terminal of said constituent element of said data transmission chain; and
        determining a transfer function relative to an impedance of said data transmission chain according to said reference voltage and said test voltage; and
    adapting said transmission power mask according to said transfer function to compensate for power lost during signal transmission through said data transmission chain.

* * * * *